United States Patent
Pentyala et al.

(10) Patent No.: US 11,599,721 B2
(45) Date of Patent: Mar. 7, 2023

(54) INTELLIGENT TRAINING SET AUGMENTATION FOR NATURAL LANGUAGE PROCESSING TASKS

(71) Applicant: salesforce.com, inc., San Francisco, CA (US)

(72) Inventors: Shiva Kumar Pentyala, Mountain View, CA (US); Mridul Gupta, San Mateo, CA (US); Ankit Chadha, Mountain View, CA (US); Indira Iyer, Hayward, CA (US); Richard Socher, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 274 days.

(21) Appl. No.: 17/002,562

(22) Filed: Aug. 25, 2020

(65) Prior Publication Data

US 2022/0067277 A1   Mar. 3, 2022

(51) Int. Cl.
  *G06F 40/253*   (2020.01)
  *G10L 15/19*    (2013.01)
  *G06F 40/30*    (2020.01)

(52) U.S. Cl.
  CPC ............ *G06F 40/253* (2020.01); *G10L 15/19* (2013.01); *G06F 40/30* (2020.01)

(58) Field of Classification Search
  None
  See application file for complete search history.

(56) References Cited

U.S. PATENT DOCUMENTS

| | | | |
|---|---|---|---|
| 2021/0201144 A1* | 7/2021 | Jonnalagadda | G06F 40/35 |
| 2021/0279424 A1* | 9/2021 | Galitsky | H04L 51/02 |
| 2021/0304733 A1* | 9/2021 | Jalaluddin | G06F 40/30 |
| 2021/0334468 A1* | 10/2021 | Yu | G06N 3/08 |
| 2021/0342552 A1* | 11/2021 | Mishra | G06F 40/40 |
| 2021/0390951 A1* | 12/2021 | Gadde | G06F 40/30 |

OTHER PUBLICATIONS

Desai, U. et al., "Benchmarking Popular Classification Models' Robustness to Random and Targeted Corruptions," arXiv:2002.00754v1, Jan. 31, 2020, pp. 1-11.

(Continued)

*Primary Examiner* — Douglas Godbold
(74) *Attorney, Agent, or Firm* — Fenwick & West LLP (57) ABSTRACT

A natural language processing system that trains task models for particular natural language tasks programmatically generates additional utterances for inclusion in the training set, based on the existing utterances in the training set and the existing state of a task model as generated from the original (non-augmented) training set. More specifically, the training augmentation module 220 identifies specific textual units of utterances and generates variants of the utterances based on those identified units. The identification is based on determined importances of the textual units to the output of the task model, as well as on task rules that correspond to the natural language task for which the task model is being generated. The generation of the additional utterances improves the quality of the task model without the expense of manual labeling of utterances for training set inclusion.

20 Claims, 6 Drawing Sheets

(56) References Cited

OTHER PUBLICATIONS

Iyyer, M. et al., "Adversarial Example Generation with Syntactically Controlled Paraphrase Networks," arXiv:1804.06059v1, Apr. 17, 2018, pp. 1-11.

Poerner, N. et al., "Evaluating neural network explanation methods using hybrid documents and morphosyntactic agreement," Proceedings of the 56th Annual Meeting of the Association for Computational Linguistics (Long Papers), Jul. 2018, pp. 340-350.

Ribeiro, M.T et al., ""Why Should I Trust You?" Explaining the Predictions of Any Classifier," arXiv:1602.04938v3, Aug. 9, 2016, pp. 1-10.

Thorne, J. et al., "Generating Token-Level Explanations for Natural Language Inference," Proceedings of NAACL-HLT 2019, Jun. 2019, pp. 963-969.

* cited by examiner

INTELLIGENT TRAINING SET AUGMENTATION FOR NATURAL LANGUAGE PROCESSING TASKS

FIELD OF ART

This disclosure relates generally to digital natural language processing systems and machine learning techniques for intelligent automatic augmentation of existing training sets for training a model for a natural language task.

BACKGROUND

Natural language processing (NLP) techniques can be used for many analytical linguistic tasks, such as sentiment inference (e.g., whether a user feels positive, negative, or neutral), intent recognition (e.g., "purchase ticket", "return product"), or named entity recognition (e.g., "ABC Corporation", "Jonathan"). When training a natural language processing model, the training set used as input to the training must contain some minimum number of samples in order to properly generalize and produce sufficient accuracy when applied to new inputs. However, preparing samples for the training set is costly, in terms both of time, labor, and money, given that the samples must be assigned labels—typically by skilled humans—that indicate the proper result for the particular natural language task for which the model is designed.

It would be desirable to programmatically expand the number of samples in the existing training set, without human intervention, but care must be taken that any such automated augmentation does not reduce the quality of the training set data. For example, any automated augmentation that altered the characteristics of the samples that are of relevance to the natural language processing task for which the model is designed would harm the accuracy of the resulting model. E.g., altering words expressing positive or negative sentiment would reduce the accuracy of a resulting sentiment analysis model. Likewise, augmenting a training set's words at random may make the resulting model more likely to adapt to the training set itself, resulting in inaccurate results when used on real-world data.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
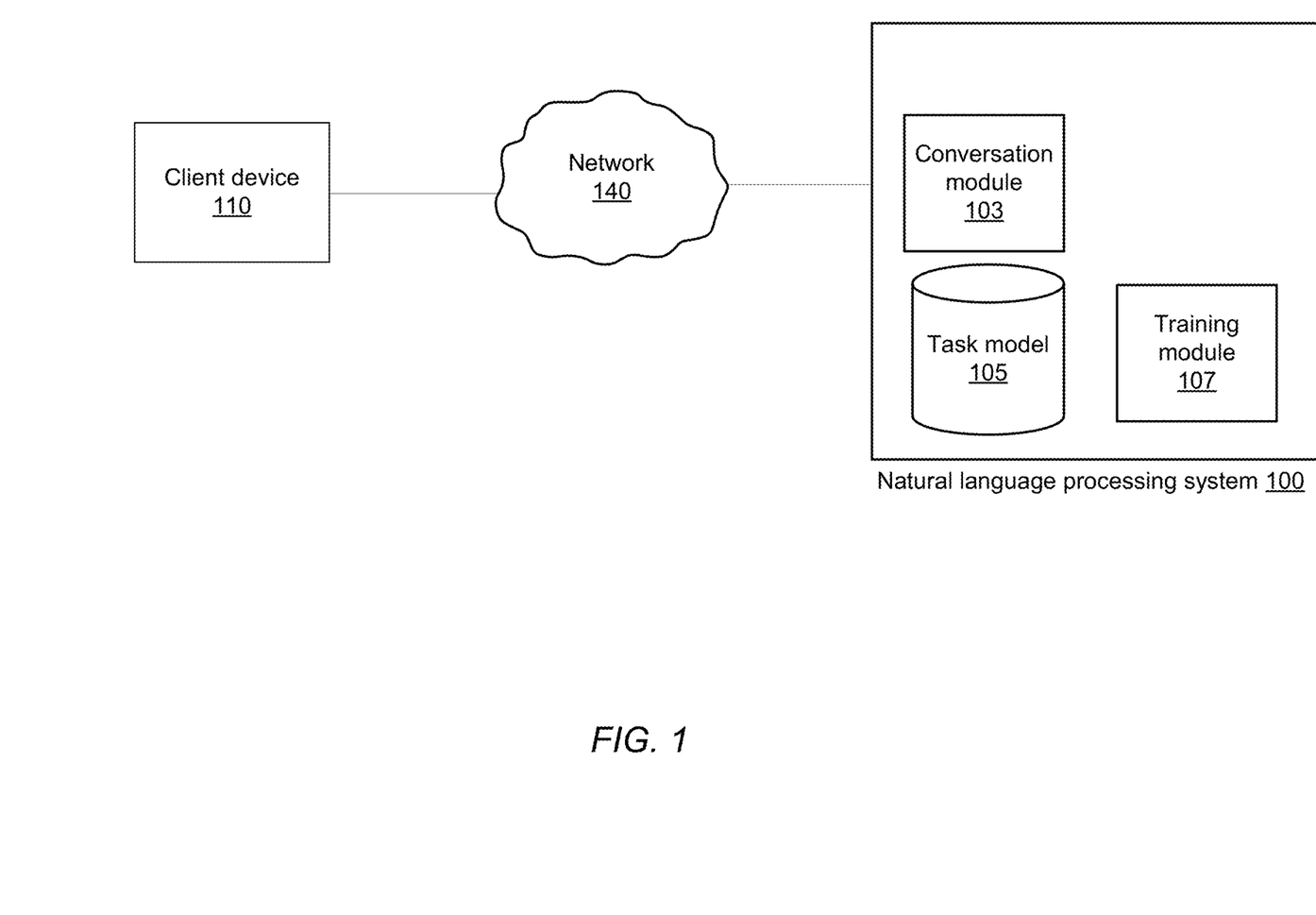
FIG. 1 illustrates the modules of a natural language processing system, according to some embodiments.

FIG. 1 illustrates the modules of a natural language processing system 100, according to some embodiments. The system 100 has a conversation module 103 that accepts natural language utterances (as either text or voice) from users of client devices 110 and that handles a conversation with the users, or otherwise takes appropriate actions in response to the users' utterances. The natural language processing abilities of the system 100 are provided in part by a task model 105, which takes a natural language utterance as input and produces as output a value appropriate for its particular natural language task, such as a {positive, neutral, negative} value for a sentiment analysis model, an indication of an intent for an intent recognition model, or an indication of an entity type for a named entity recognition model.

The system 100 also includes a training module 107 that trains the task model 105 based on a labeled training set. As is described in more detail below with respect to FIG. 2, the training module 107 includes functionality to augment an existing labeled training set, resulting in more (but still representative) data, and hence a more comprehensive and accurate task model.

In some embodiments, the training module 107 and the conversation module 103/task module 105 may be on separate systems, such as those administered by separate organizations, with one system storing and using the task model trained by the other system.

Figure 2:
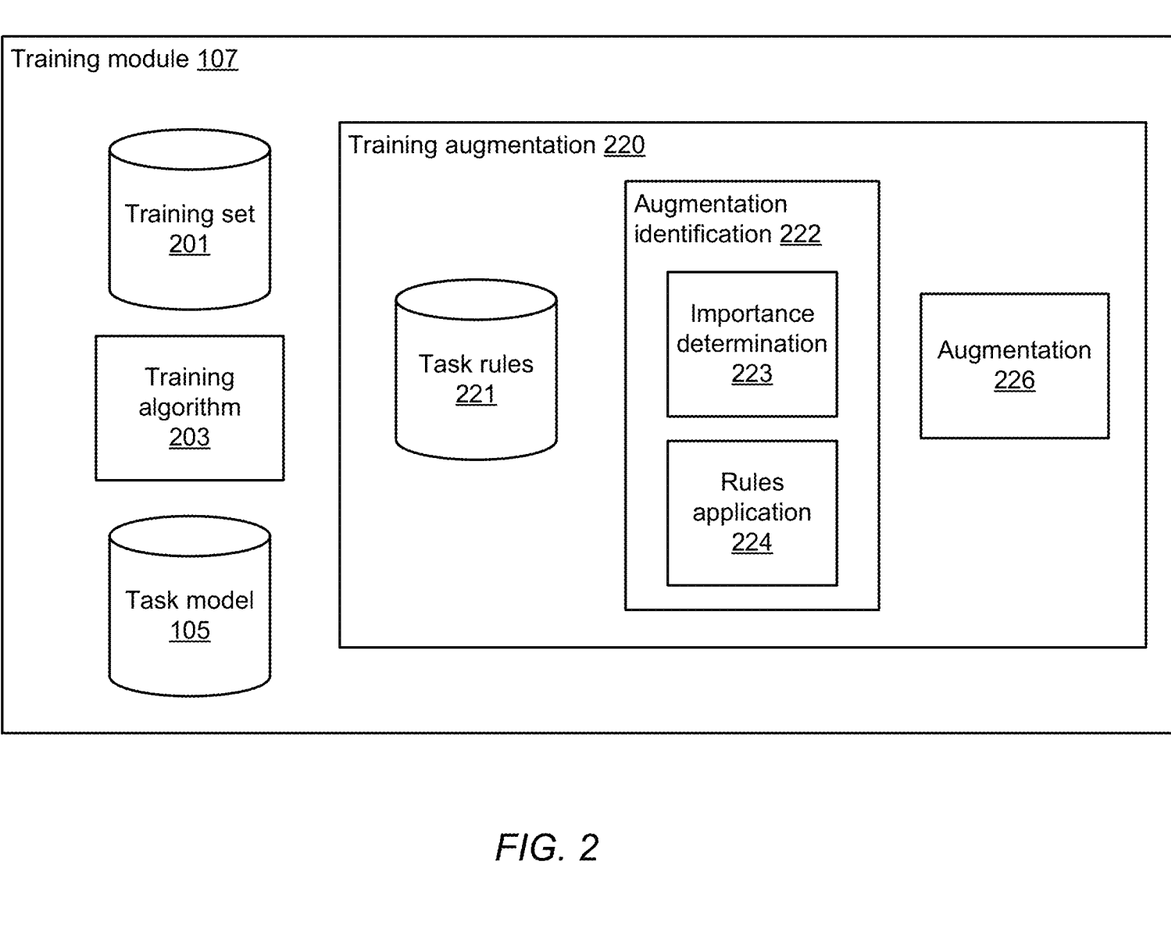
FIG. 2 illustrates the sub-components of the training module of FIG. 1, according to some embodiments.

FIG. 2 illustrates the sub-components of the training module 107 of FIG. 1, according to some embodiments.

The training module includes a training set 201; the task model 105, which is generated by a training algorithm 203 using data from the training set 201; and a training augmentation module 220, which increases the size of the training set by identifying portions of the utterances in the training set that are appropriate for augmentation, and then generating additional training utterances using variations of the identified portions.

The training set 201 contains utterances used to train the task model 105 for a particular task, such as utterances like "All of us like Spider Man movies", "I want to return my purchase", "How do I change my password?", or "My current coworker introduced me to golf. I miss Deborah." The utterances are labeled with a value corresponding to the natural language processing task in question, such an indication that the user reaction is positive (or negative, or neutral) in the case of a sentiment analysis task, or a list of possible intents and corresponding probabilities for that intent for an intent recognition task.

As previously noted, it is costly to produce a large training set, given the need to provide labels for the utterances in the training set, often by specialized human employees. However, training sets of insufficient size may result in models with generalize poorly to utterances outside of the training set. Accordingly, the training module 107 includes a training augmentation module 220 that programmatically generates additional utterances for inclusion in the training set, based on the existing utterances in the training set and the existing state of the task model 105 as generated from the original (non-augmented) training set. More specifically, the training augmentation module 220 identifies specific portions of utterances and generates variants of the utterances based on those identified portions. (The portions which may be identified are hereinafter referred to as "textual units," and in different embodiments can be individual words, individual word fragments, sequences of adjacent words, or even groups of non-adjacent words. In order to identify the textual units of utterances to use as the basis for additional variants to be added to the training set, the training augmentation module 220 does not merely select textual units at random, but rather identifies the textual units based on factors indicating the relevance and suitability of the textual units for the creation of variations. In the embodiment discussed further below, the training augmentation module 220 bases the identification on two factors: (1) the importance of the textual unit to the task model 105 in arriving at its result, and (2) rules that are specific to the type of natural language processing task in question.

Thus, the training augmentation module 220 includes an augmentation identification module 222 that identifies textual units of utterances in the training set 201, as well as an augmentation module 226 that produces new variants of the utterances to add to the training set. The augmentation identification module 222 refers to task rules 221 when performing the identification of the textual units.

The augmentation identification module 222 includes an importance determination module 223 that determines importances of individual textual units of an utterance to the task model 105 when producing output for the utterance. For example, the importance determination module 223 can produce an importance score for each of the textual units in a given utterance, indicating how influential each textual unit was for the task model 105.

Figure 5:
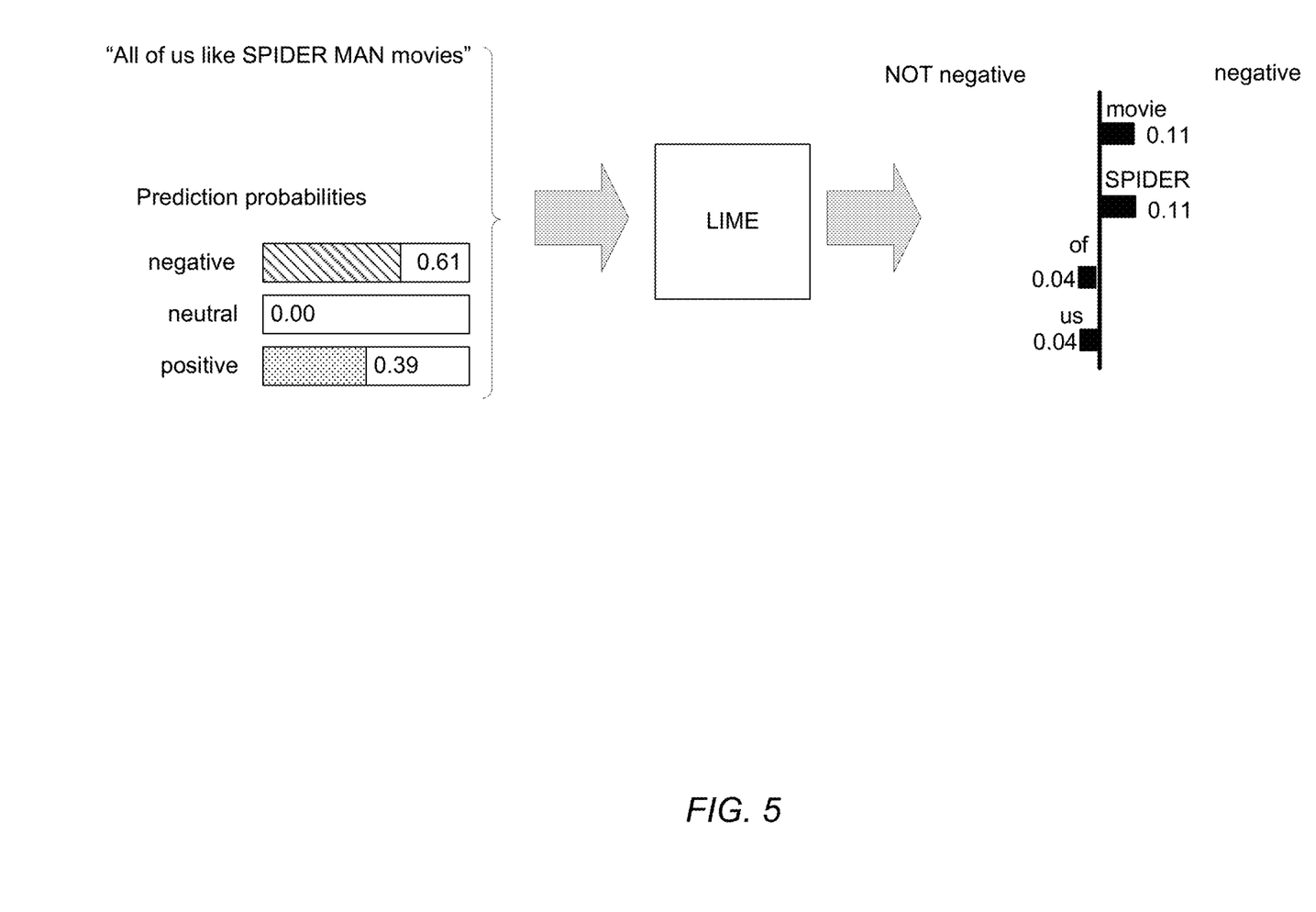
FIG. 5 illustrates an example use of the LIME technique, according to one embodiment.

The importance determination module 223 can be implemented using different algorithms in different embodiments. For example, in some embodiments the importance determination module 223 leverages an algorithm originally designed to allow assessment of the trustworthiness of a given model. For instance, one such state-of-the-art algorithm is Local Interpretable Model-Agnostic Explanations (LIME), which approximates the task model 105 with an interpretable model learned on perturbations of the input utterances. Algorithms such as LIME take as input the task model 105 and an utterance, generate perturbations of the utterance, and analyze the importances of the various textual units within that utterance by measuring the impact of the perturbations in those textual units on the output of the task model 105. Specifically, LIME can learn a reasonable approximation of the behavior of the task model for the utterance U, making the importance scores of the textual units more reliable. Thus, such an algorithm treats the task model 105 as a "black box," only analyzing the model's output space rather than its internals. For example, FIG. 5 illustrates one example use of LIME for the utterance "All of us like SPIDER MAN movies" and a model that produces prediction probabilities 0.61 that the utterance indicates negative sentiment, 0.39 that the utterance indicates negative sentiment, and 0.00 that the utterance indicates neutral sentiment, where LIME determines that the textual units "movie" and "SPIDER" each have a weight of 0.11 in contributing toward negative sentiment, and that the textual units "of" and "us" each have a weight of 0.04 of contributing toward positive sentiment.

The augmentation identification module 222 additionally includes a rules application module 224 that applies task rules 221 that are specific to the natural language processing task for which the task model 105 is being trained.

The task rules 221 are specific to the particular natural language processing task, and they are designed to determine whether it would be appropriate to insert a variant of a particular textual unit when creating an utterance variant, or whether that would fundamentally change the output of the task model 105. As one example, if the task model 105 were trained to perform sentiment analysis, nouns and conjunctions might be good candidates for variants because they are unlikely to change the sentiment expressed by the utterance, whereas adjectives and adverbs would not be good candidates because they would be likely to change the sentiment. Thus, the task rules 221 for a sentiment analysis task might determine the grammatical part of speech of the different textual units in the utterance, permitting variants of nouns and conjunctions but prohibiting variants of adjectives and adverbs. Accordingly, for an utterance "We all like Spider Man movies" from the training set 201, the task rules 221 would permit generation of a variant for the textual unit "movies" (a compound noun), such as the variant "We all like Spider Man films." As other examples, the task rules 221 for intent classification might prohibit variants for verbs but allow them for other parts of speech, and task rules for named entity recognition might prohibit variants for nouns but allow them for other parts of speech.

In addition to grammatical part of speech rules, the task rules 221 could include term frequency-inverse document frequency ("tf-idf") rules. Such rules determine the relative frequency of a particular textual unit in the current utterance relative to its frequency in the utterances of the training set 201 as a whole, generating variants for textual units with comparatively lower tf-idf scores. The tf-idf scores may be computed for textual units in utterances during the training phase, with textual units belonging to a specific label as one document and thus computing tf-idf scores for individual textual units across all documents. The precomputed tf-idf scores can then later be used to obtain individual textual unit importance scores within an utterance. Alternatively, in some embodiments a hybrid approach is used, choosing a small percentage of high importance textual units in addition to a larger proportion of lower-importance textual units. This may lead to variants that are "noisier" for training a model, but enables the model to make more reliable predictions at runtime on noisier utterances, thereby having better generalization ability. Tf-idf rules are useful for tasks such as intent classification, sentiment analysis, topic classification, named entity recognition, and the like.

The task rules 221 may also include grammar-based rules, e.g., replacing particular grammatical patterns such as "<VERB>?<ADV>*<VERB> (an optional verb, zero or more adverbs, and a verb) or <ART><ADJ><NOUN> (a definite or indefinite article, an adjective, and a noun) with variants, such as by substituting a synonym for each word, or by employing techniques such as Contextual BERT or other algorithms, or the like.

It is understood that the task rules 221 need include only part of speech rules or tf-idf rules, but rather can include any type of rules that can help to identify, for a particular type of natural language processing task, whether to generate a variant for a given textual unit of an utterance.

In one embodiment, the rules application module 224 is applied to the top k (e.g., k=3) textual units of the utterance, as determined according to the importance scores produced by the importance determination module 223. This has the effect of identifying the textual units that particularly influence the output of the task model 105 for the given utterance, but that (at the same time) will not change the essential meaning of the utterance if they are replaced with variants. This results in an augmented training set that that is likely to provide better generalization than the original training set would, while avoiding model inaccuracies that would result from allowing variations that would change the meaning of the utterance from the perspective of the natural language task.

Generalization power is particularly important in contexts where user utterances may be short and "noisy," such as in user conversations with chatbots, where the user may input utterances such as "hi," "hey there", "transfer to representative", or "you there?", all of which indicate an intent to specify a initiate a conversation. Similarly, it is valuable for a model to have significant generalization power in contexts where the same words or expressions may have multiple, significantly different meanings that would alter the meaning of the utterance from the perspective of the natural language task. (E.g., the adjective "cool" or "gay" for a sentiment analysis task.)

The training augmentation module 220 has an augmentation module 226 that—for a given utterance and textual unit within the utterance—creates a variant utterance for inclusion within the training set 201. Variants can be created in different manners in different embodiments, and/or for different types of tasks or textual units. For example, one type of variant replaces a particular textual unit with a synonym. For instance, referring to a prior example, for the utterance "We all like Spider Man movies," a variant based on the textual unit "movies" could be the synonym "films," leading to the variant utterance "We all like Spider Man films." This variant utterance would then be added to the training set 201. Variants of a textual unit may be created using a statistical language model, such as a masked language model (e.g., BERT) that masks certain textual units based on task-specific rules or on insights obtained from computations such as those of LIME or tf-idf, or the like. Variants of a textual unit may also be generated through synonym replacement, textual unit deletion, textual unit swapping/reordering, or the like. The variant utterance is also assigned the same label value for the natural language task as was assigned to the original utterance itself, on the assumption that the creation of the variant retains the same essential meaning with respect to the natural language task.

With the training set 201 augmented by the inclusion of variants of utterances already within the training set, the same training algorithm 203 used to train the task model 105 on the initial training set 201 can be used to re-train the task model based on the augmented training set. The training algorithm 203 can vary in different embodiments and for different types of natural language processing tasks (e.g., sentiment analysis, or intent prediction), and can include algorithms such as neural networks, support vector machines (SVM), linear regression, Naïve Bayes, or the like.

Re-training the task model 105 based on the augmented training set 201 results in better model accuracy due to generalizing better by strategically selecting textual units to augment so as to be less likely to change the meaning of the utterance than with random selection. Relative to a random augmentation, the disclosed selective augmentation also results in greater sample efficiency, in that less augmentation is needed to obtain the same accuracy as with random augmentation, so the training time is less.

Figure 6:
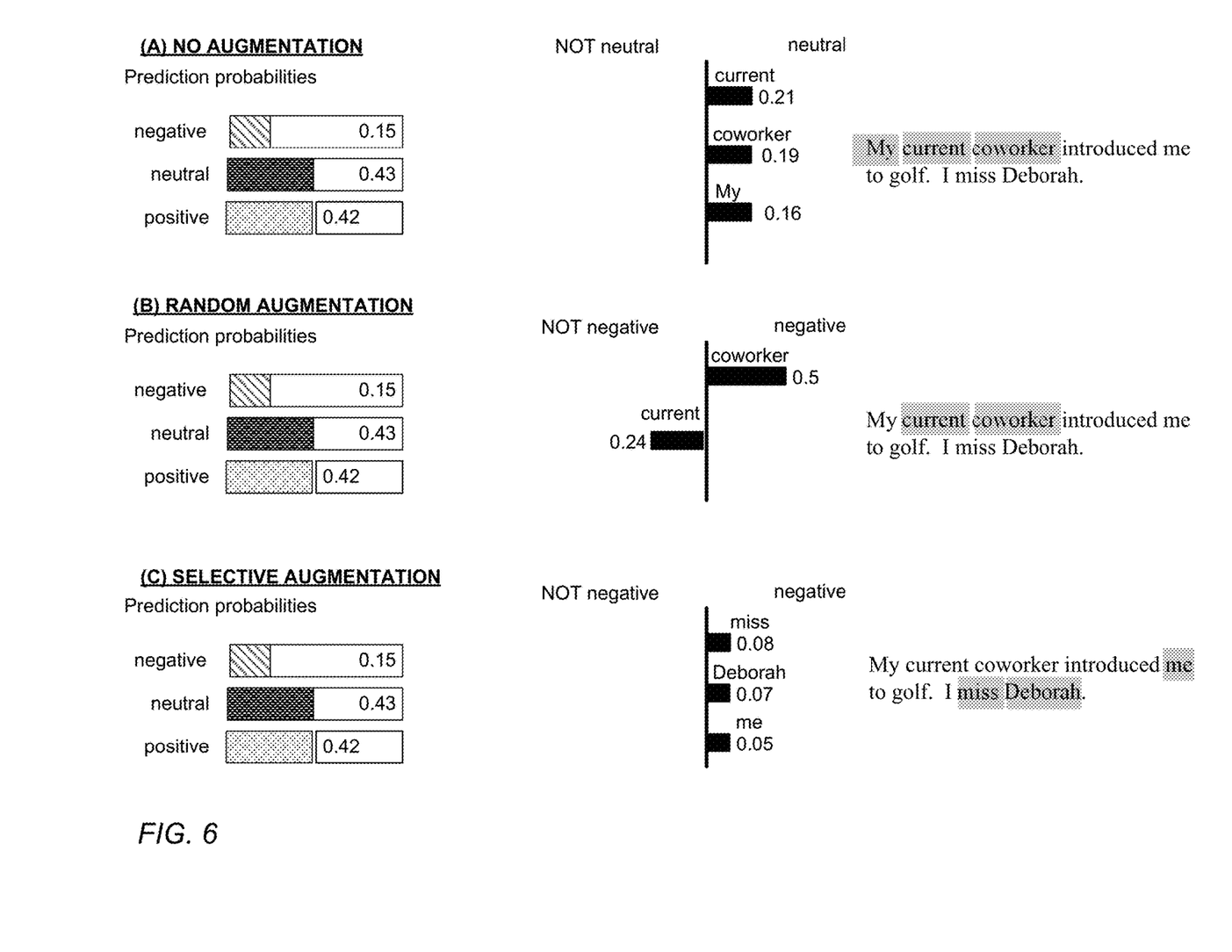
FIG. 6 illustrates examples of the accuracies of models trained according to various techniques.

As an example of improved accuracy due to the use of informed, selective augmentation of textual units, FIG. 6 illustrates the various accuracies of models trained (A) without augmentation, (B) with augmentation of randomly-selected textual units, and (C) with augmentation of textual units selected by the techniques discussed above. The random augmentation of (B) improves upon models without any augmentation as in (A), but although it properly makes the prediction "negative sentiment" for the utterance "My current coworker introduced me to golf. I miss Deborah.", it incorrectly focuses on the textual units "current" and "coworker" instead of focusing on the textual unit "miss"). This could hinder the model's ability to generalize beyond training samples. In contrast, with the informed augmentation of (C), the model not only makes the right prediction, but it also focuses on the right textual units (e.g., "miss") to make that decision.

Figure 3:
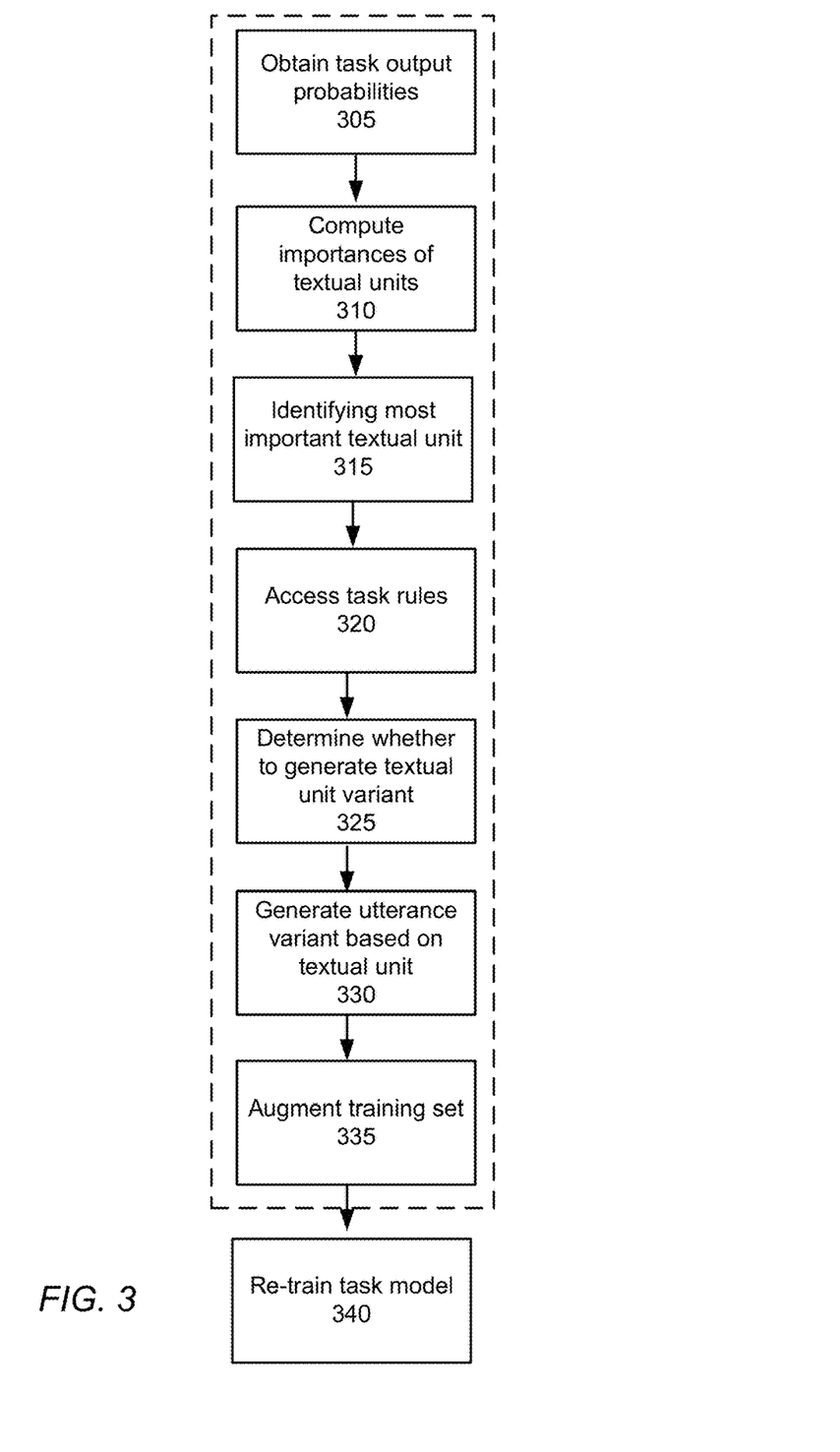
FIG. 3 is a flowchart illustrating actions performed by the training module of FIG. 1 when augmenting a training set and re-training a task model for a particular type of natural language task, according to one embodiment.

FIG. 3 is a flowchart illustrating actions performed by the training module 107 when augmenting the training set 201 and re-training the task model 105 for a particular type of natural language task, according to one embodiment.

For a given utterance in the training set 201, the task output probabilities of various possible outputs for the natural language task are obtained 305 by applying the given task model to the utterance. For example, for the utterance "All of us like Spider Man movies," and for a sentiment analysis task, the task model 105 might determine that the utterance is 65% likely to indicate positive sentiment, 25% likely to indicate negative sentiment, and 10% likely to indicate neutral sentiment.

The importances of the textual units of the utterance to the task model 105 when computing the task output probabilities are also computed 310. Task rules Steps 305 and 310 may both be performed by the importance determination module 223 of FIG. 2. That is, the importance determination module 223 may take the task model 105 as input and obtain 305 the output probabilities by applying the task model, and then use the obtained probabilities as part of the determination of which textual units are the most important in producing those probabilities.

The rules application module 224 accesses 320 the task rules 221 and uses them to determine 325, for each of the k most important textual units in the utterance, whether to generate a variant of the utterance based on that textual unit.

If the rules application module 224 determines that a variant of the utterance should be generated, then the augmentation module 226 generates the utterance variant, which is then used to augment 335 the training set 201, and associates the same label with the utterance variant as is already associated with the original utterance.

Steps 305-335 can be performed for each of the utterances in the training set 201, potentially considering each utterance as a candidate for the generation of variants.

When the training set 201 has been augmented 335 by the various variants generated in step 330, in some embodiments the training algorithm 203 re-trains the task model 105.

Figure 4:
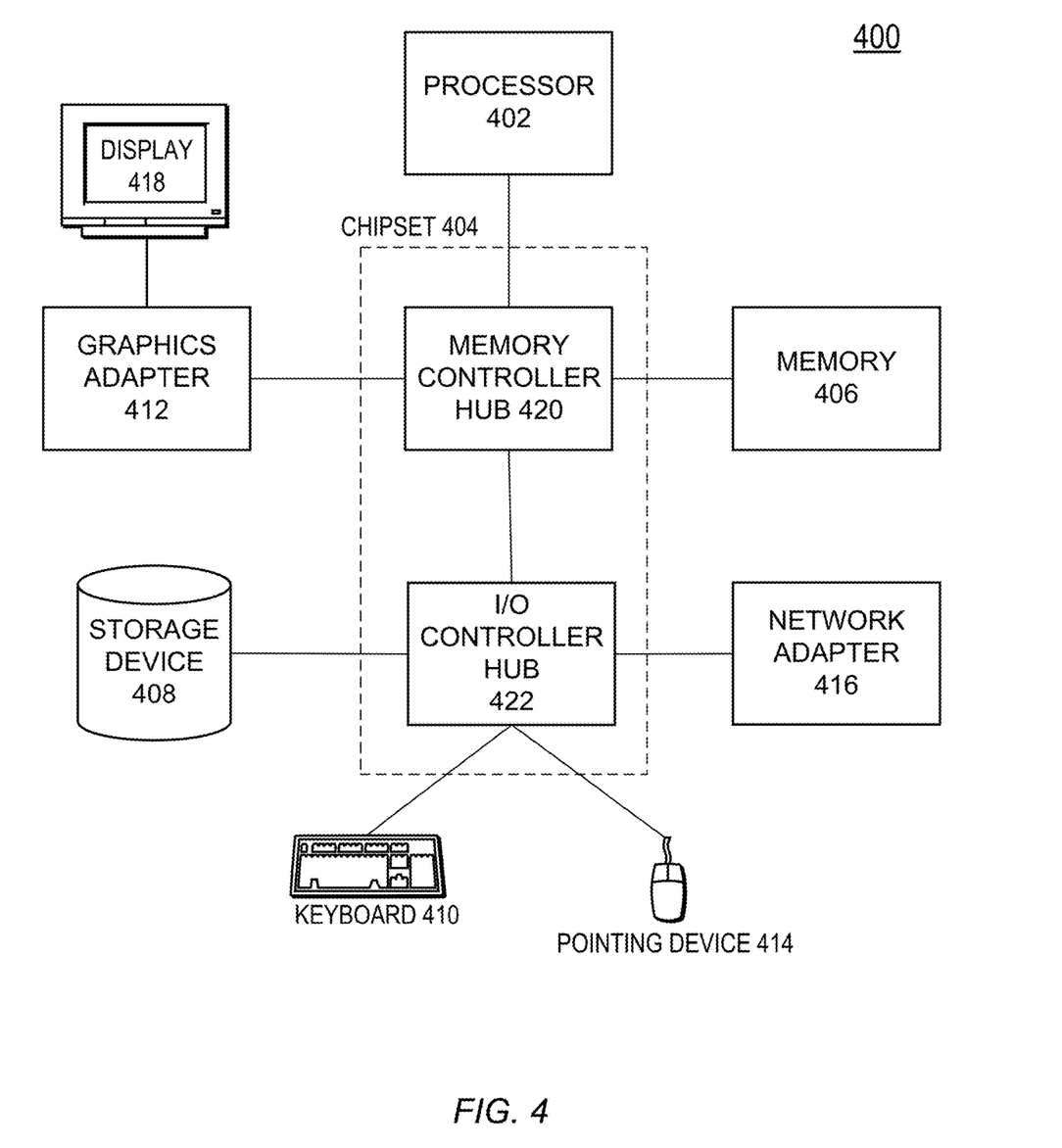
FIG. 4 is a high-level block diagram illustrating physical components of a computer used as part or all of the system from FIG. 1, according to one embodiment.

FIG. 4 is a high-level block diagram illustrating physical components of a computer 400 used as part or all of the system 100 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard 410 or pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs a sales force where each salesperson uses a client device to manage their sales process. Thus, a user might maintain contact data, leads data, customer follow-up data, performance data, goals and progress data, etc., all applicable to that user's personal sales process.

In one embodiment, a multi-tenant computer system implements a web-based customer relationship management (CRM) system. For example, the system includes application servers configured to implement and execute CRM software applications as well as provide related data, code, forms, webpages and other information to and from client devices and to store to, and retrieve from, a database system related data, objects, and webpage content. The capabilities described above are part of the CRM software applications. The activity being analyzed may be past, current and future sales transactions.

With a multi-tenant system, data for multiple tenants may be stored in the same physical database. However, tenant data typically is arranged so that data of one tenant is kept logically separate from that of other tenants so that one tenant does not have access to another tenant's data, unless such data is expressly shared. A tenant metadata store stores information that allows identification of data for different tenants, for example, using identifiers that uniquely identify each tenant.

In certain embodiments, the system implements applications other than, or in addition to, a CRM application. For example, the system may provide tenant access to multiple hosted (standard and custom) applications, including a CRM application. According to one embodiment, the system is configured to provide webpages, forms, applications, data and media content to client devices to support the access by client devices as tenants of system. As such, the system provides security mechanisms to keep each tenant's data separate unless the data is shared.

A multi-tenant system may implement security protocols that keep data, applications, and application use separate for different tenants. In addition to user-specific data and tenant-specific data, the system may maintain system level data usable by multiple tenants or other data. Such system level data may include industry reports, news, postings, and the like that are sharable among tenants.

The processes described above may also be implemented on other types of systems, for example client-server systems, mobile technology and devices, mobile networks, wearable devices, tablets, PCs, software-as-a-service, etc.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of this disclosure but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of patent rights should be determined by the appended claims and their legal equivalents.

What is claimed is:

1. A computer-implemented method for selectively augmenting utterances of a training set for a natural language task, the method comprising:

for a natural language utterance of the training set, using, by one or more processors, a task model for a natural language task to determine probabilities of possible task outputs;

computing, by the one or more processors, importances of textual units of the utterance to the task model when determining the probabilities;

identifying, by the one or more processors, a most important textual unit of the utterance based on the computed importances;

accessing, by the one or more processors, task rules stored in system memory and corresponding to the natural language task;

determining, by the one or more processors, using the task rules, whether to generate a variant of the utterance based on the identified textual unit;

responsive to the determining, generating, by the one or more processors, a variant of the utterance based on the identified textual unit;

generating an augmented training set by adding the variant of the utterance to the training set; and re-training, by the one or more processors, the task model using the augmented training set and the variant of the utterance, the re-training performed using at least one of: neural networks, support vector machines (SVM), linear regression, or Naïve Bayes.

2. The computer-implemented method of claim 1, wherein the natural language task comprises at least one of sentiment analysis, intent recognition, and named entity recognition.

3. The computer-implemented method of claim 1, wherein the textual units are sequences of adjacent words within the utterance.

4. The computer-implemented method of claim 1, wherein the task rules comprise at least one of: grammatical part-of-speech rules, and tf-idf rules.

5. The computer-implemented method of claim 1, wherein computing importances of the textual units of the utterance to the task model comprises using Local Interpretable Model-Agnostic Explanations (LIME).

6. The computer-implemented method of claim 1, wherein generating a variant of the utterance based on the identified textual unit comprises replacing the textual unit with a synonym of the textual unit.

7. The computer-implemented method of claim 1, further comprising repeating the steps of claim 1 for a second natural language task different from the natural language task.

8. The computer-implemented method of claim 1, wherein identifying a most important textual unit comprises identifying a plurality of textual units comprising k textual units of the utterance corresponding to a top k of the computed importances.

9. A non-transitory computer-readable storage medium storing instructions for selectively augmenting utterances of a training set for a natural language task, the instructions when executed by a computer processor performing actions comprising:

for a natural language utterance of the training set, using, by one or more processors, a task model for a natural language task to determine probabilities of possible task outputs;

computing, by the one or more processors, importances of textual units of the utterance to the task model when determining the probabilities;

identifying, by the one or more processors, a most important textual unit of the utterance based on the computed importances;

accessing, by the one or more processors, task rules stored in system memory and corresponding to the natural language task;

determining, by the one or more processors, using the task rules, whether to generate a variant of the utterance based on the identified textual unit;

responsive to the determining, generating, by the one or more processors, a variant of the utterance based on the identified textual unit;

generating, by the one or more computer processors, an augmented training set by adding the variant of the utterance to the training set; and re-training, by the one or more processors, the task model using the augmented training set and the variant of the utterance, the re-training performed using at least one of: neural networks, support vector machines (SVM), linear regression, or Naïve Bayes.

10. The non-transitory computer-readable storage medium of claim 9, wherein the natural language task comprises at least one of sentiment analysis, intent recognition, and named entity recognition.

11. The non-transitory computer-readable storage medium of claim 9, wherein the textual units are sequences of adjacent words within the utterance.

12. The non-transitory computer-readable storage medium of claim 9, wherein the task rules comprise at least one of: grammatical part-of-speech rules, and tf-idf rules.

13. The non-transitory computer-readable storage medium of claim 9, wherein computing importances of the textual units of the utterance to the task model comprises using Local Interpretable Model-Agnostic Explanations (LIME).

14. The non-transitory computer-readable storage medium of claim 9, wherein generating a variant of the utterance based on the identified textual unit comprises replacing the textual unit with a synonym of the textual unit.

15. The non-transitory computer-readable storage medium of claim 9, the instructions further comprising repeating the steps of claim 1 for a second natural language task different from the natural language task.

16. The non-transitory computer-readable storage medium of claim 9, wherein identifying a most important textual unit comprises identifying a plurality of textual units comprising k textual units of the utterance corresponding to a top k of the computed importances.

17. A computer system comprising:

one or more computer processors; and non-transitory computer-readable storage medium storing instructions for selectively augmenting utterances of a training set for a natural language task, the instructions when executed by the one or more computer processor devices performing actions comprising:

for a natural language utterance of the training set, using, by the one or more processors, a task model for a natural language task to determine probabilities of possible task outputs;

computing, by the one or more computer processors, importances of textual units of the utterance to the task model when determining the probabilities;

identifying, by the one or more computer processors, a most important textual unit of the utterance based on the computed importances;

accessing, by the one or more computer processors, task rules stored in system memory and corresponding to the natural language task;

determining, by the one or more computer processors, using the task rules, whether to generate a variant of the utterance based on the identified textual unit;

responsive to the determining, generating, by the one or more computer processors, a variant of the utterance based on the identified textual unit;

generating, by the one or more computer processors, an augmented training set by adding the variant of the utterance to the training set; and re-training, by the one or more processors, the task model using the augmented training set and the variant of the utterance, the re-training performed using at least one of: neural networks, support vector machines (SVM), linear regression, or Naïve Bayes.

18. The computer system of claim 17, wherein the natural language task comprises at least one of sentiment analysis, intent recognition, and named entity recognition.

19. The computer system of claim 17, wherein the textual units are sequences of adjacent words within the utterance.

20. The computer system of claim 17, wherein the task rules comprise at least one of: grammatical part-of-speech rules, and tf-idf rules.

* * * * *